UNITED STATES PATENT OFFICE.

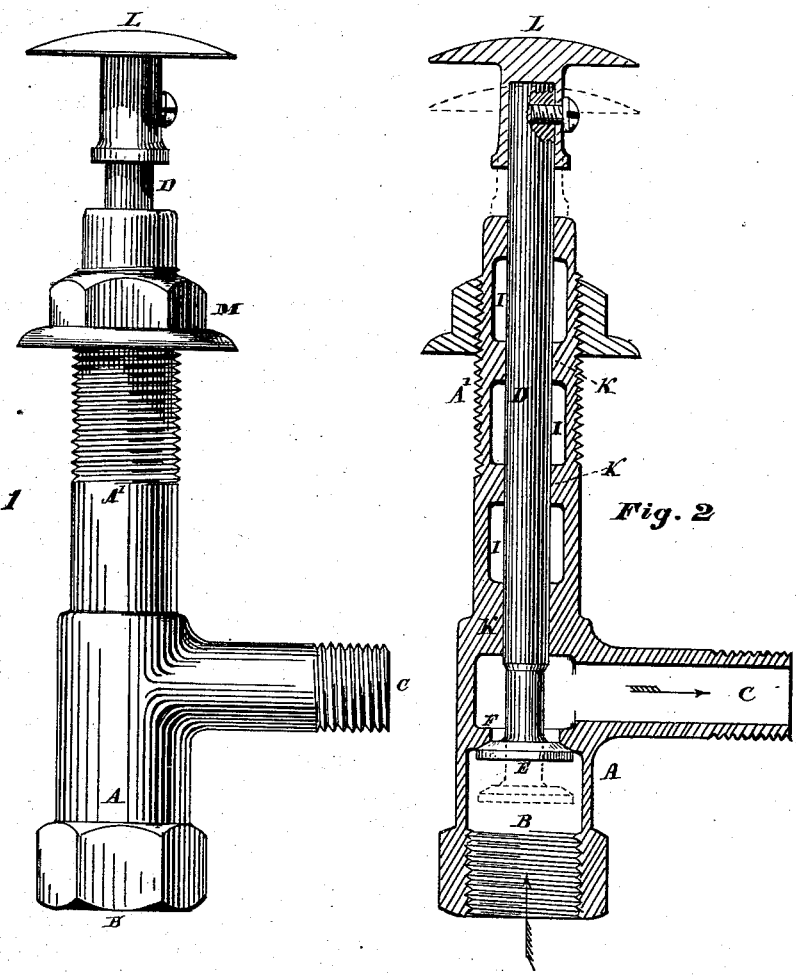

JOHN B. TOUGAS, OF WORCESTER, MASSACHUSETTS, ASSIGNOR OF ONE-HALF HIS RIGHT TO ALBION P. RICHARDSON, OF SAME PLACE.

IMPROVEMENT IN SELF-CLOSING WATER-COCKS.

Specification forming part of Letters Patent No. 161,077, dated March 23, 1875; application filed December 28, 1874.

*To all whom it may concern:*

Be it known that I, JOHN B. TOUGAS, of the city and county of Worcester and State of Massachusetts, have invented certain new and useful Improvements in Self-Closing Water-Cocks; and I do hereby declare that the following is a full, clear, and exact description of the same, reference being had to the accompanying drawings, which form a part of this specification, and in which—

Figure 1 represents a side view of my improved self-closing water-cock; and Fig. 2 represents a central section of the same.

The object of this invention is to provide a cheap, simple, and convenient water-cock, rendered self-closing by the action of the water, and not requiring packing-nuts and washers. My invention consists in a self-closing cock, the parts of which are constructed and arranged for operation as hereinafter described.

In the drawings, A A¹ denote the body or shell of the cock, provided with the inlet-passage B and outlet-passage C. D indicates the valve-spindle, formed of a single straight piece of metal, arranged through the upright portion A' of the body, and provided with a valve, E, at its lower end, which fits onto the under side of a valve-seat, F, between the inlet B and outlet C, so as to close the passage when the spindle D is raised, and to open the passage when spindle D is depressed. A series of air-chambers, I, are formed in the upper part A' of the body around the valve-spindle D, the portions K between said chambers being fitted closely to the surface of the spindle.

By this construction the spindle D is caused to move with but slight friction, while the air in the chambers I assists in preventing the escape of water around the spindle, so that packing-washers are not required.

The inlet-passage B is made with but very little greater diameter than the valve E, so that when said valve E is depressed by pressure applied to the hand-knob L, the water can flow past the valve at all sides thereof; but when the knob is released the action of the water pressing against the valve raises the spindle and closes the valve against its seat, and thus shuts off the passage. The valve remains closed so long as the pressure of water upon the under side of the valve is greater than the downward pressure on the spindle.

The cock herein shown is designed as a hopper-cock for water-closets; and the nut M is for securing the cock in position upon the woodwork or casing.

Should the water be shut off from the supply-pipe, as is frequently necessary in frosty weather, the cock will open and admit air, so that the water can drain from the pipe; and then when the water is again let on the cock will close, thus obviating the necessity of a person attending to open or close the cock every time the water is turned off and on to the supply-pipes.

This cock is simple and durable in construction, and is not liable to derangement; and as it requires no springs and packing nuts or washers, it can be manufactured at a comparatively small cost.

I am aware that several varieties of self-closing cocks have heretofore been made and used, and I do not herein make claim, broadly, to a self-closing cock; but What I do claim as new and of my invention, and desire to secure by Letters Patent, is—

The cock or faucet herein described, consisting of the shell or body A A¹, with passages B C, valve-seat F, and the portions or projections K K K, the same forming air-chambers I, and the valve and spindle D E, as and for the purpose set forth.

JOHN B. TOUGAS.

Witnesses:
CHAS. H. BURLEIGH,
E. F. BURLEIGH.